United States Patent
Cumby et al.

(10) Patent No.: US 12,530,557 B2
(45) Date of Patent: Jan. 20, 2026

(54) RFID DEVICE FOR INJECTION MOLDING

(71) Applicant: Avery Dennison Retail Information Services LLC, Mentor, OH (US)

(72) Inventors: Brad Cumby, Liberty Township, OH (US); Katariina Penttila, Tampere (FI); Antti Valtonen, Tampere (FI); Tiina Vuorinen, Tampere (FI)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/726,175

(22) PCT Filed: Jan. 18, 2023

(86) PCT No.: PCT/IB2023/050440
§ 371 (c)(1),
(2) Date: Jul. 2, 2024

(87) PCT Pub. No.: WO2023/148568
PCT Pub. Date: Aug. 10, 2023

(65) Prior Publication Data
US 2025/0068879 A1    Feb. 27, 2025

Related U.S. Application Data

(60) Provisional application No. 63/305,504, filed on Feb. 1, 2022.

(51) Int. Cl.
*G06K 19/077* (2006.01)

(52) U.S. Cl.
CPC ... *G06K 19/07724* (2013.01); *G06K 19/0773* (2013.01); *G06K 19/0775* (2013.01)

(58) Field of Classification Search
CPC ......... G06K 19/0772; G06K 19/07722; G06K 19/07724; G06K 19/0775
See application file for complete search history.

(56) References Cited

U.S. PATENT DOCUMENTS 6,940,408 B2    9/2005  Ferguson et al.
7,135,979 B2 *  11/2006  Savagian ......... G06K 19/07749
                                            428/354

(Continued)

FOREIGN PATENT DOCUMENTS

CN    102376006 A  *  3/2012
CN    111444996       7/2020

(Continued)

OTHER PUBLICATIONS

International Preliminary Report on Patentability dated Aug. 6, 2024 issued in corresponding IA No. PCT/IB2023/050440 filed Jan. 18, 2023.

(Continued)

*Primary Examiner* — Thien M Le
*Assistant Examiner* — April A Taylor

(57) ABSTRACT

The invention relates to a Radio-Frequency Identification (RFID) device for an injection molded product comprising layers of different components to reduce thermal shrinkage or expansion and failure of the RFID inlay due to the high temperatures during injection molding. The introduced device allows for a thin build and a flat, smooth injection molded product.

12 Claims, 1 Drawing Sheet

(56) References Cited

U.S. PATENT DOCUMENTS

| | | | |
|---|---|---|---|
| 7,292,148 B2 | 11/2007 | Forster | |
| 8,511,569 B1* | 8/2013 | Koepp | G06K 19/07754 |
| | | | 235/492 |
| 9,636,857 B2 | 5/2017 | Nishizawa et al. | |
| 10,198,677 B2 | 2/2019 | Forster | |
| 11,755,874 B2* | 9/2023 | Garcia | G06K 19/0772 |
| | | | 340/572.8 |
| 11,763,127 B2* | 9/2023 | Janko | G06K 19/07764 |
| | | | 235/488 |
| 12,265,873 B2* | 4/2025 | Nitta | G06K 19/0776 |
| 2007/0210924 A1* | 9/2007 | Arnold | G06K 19/07722 |
| | | | 340/572.8 |

FOREIGN PATENT DOCUMENTS

| | | |
|---|---|---|
| EP | 1873693 | 1/2008 |
| EP | 3690748 | 8/2020 |
| EP | 4367600 | 5/2024 |
| WO | 2008/132287 | 11/2008 |

OTHER PUBLICATIONS

International Search Report and Written Opinion dated Mar. 21, 2023 issued in corresponding IA No. PCT/IB2023/050440 filed Jan. 18, 2023.

\* cited by examiner

RFID DEVICE FOR INJECTION MOLDING

CROSS-REFERENCE TO RELATED APPLICATION(S)

The present application is a national stage application under 35 U.S.C. § 371 of international Application No. PCT/IB2023/050440, which was published in English on Aug. 10, 2023, and claims the benefit of U.S. Provisional Patent Application No. 63/305,504, filed Feb. 1, 2022, each of which is incorporated by reference herein in its entirety.

FIELD

Multi-layer RFID inlays in which the antenna is protected from deformation are described herein. Processes for constructing the inlays, which stay stable in the injection mold process are described herein.

BACKGROUND

Radio-Frequency Identification (RFID) Devices, such as RFID tags or labels, can be used to track an item, article, or product through its lifecycle and/or through the supply chain. Injection molded products may be tagged using such devices, tags, or labels by attaching or adhering an RFID tag to the surface of the product or embedding the RFID tag in the product.

Conventional techniques for attaching tags or labels to an article are not suitable for attaching or adhering an RFID tag to an injection molded article. For example, the RFID tag or labels intended to be affixed to an injection molded article must be done so after the injection molding is complete. This requires a film or layer of adhesive to be applied to the surface of the injection molded article or the surface of the tag/label after injection molding to effect adherence between the product and the tag/label.

Previous attempts to embed an RFID tag/label in the product during injection molding have been largely unsuccessful. For example, during the embedding process, air often remains inside the articles resulting in a cave or hole near the tag/label. Other limitations include off-gassing as a result of the materials used in the production of the RFID tags/labels. Both of these defects can weaken the strength of the injection molded article. Additionally, carrier substrates used in the RFID device may be adversely affected by heat during injection molding. PET-based materials, which are often used as substrates for the antenna in RFID tags/labels, may shrink and deform under the application of heat and thereby change the properties of the antenna or weaken the chip attachment to the substrate. This can result in permanent device failure during the injection molding process.

Attempts to overcome the limitations described above have been described. For example, multi-step manufacturing processes have been proposed; however, such processes increase manufacturing cost, time, and complexity. In another example, the antenna and IC are encapsulated with thick layers of a hot-melt adhesive. While such a process may take less time than multi-step manufacturing processes, the temperatures and thermal shrinking/expansion involved limits the antenna type/configuration that can be used. Finally, coating both sides of the substrate with a polyolefin layer, such as LDPE, has been proposed.

There exists a need for improved processes for attaching or embedding an RFID tag/label in an injection molded article during the injection molding process. There is also a need for a robust RFID tag/label which can survive the injection molding process without adverse effects such that the tag/label is fully functional/operational.

Therefore, it is an object of this disclosure to provide improved processes for attaching or embedding an RFID tag/label in an injection molded article during the injection molding process.

It is also an object of this disclosure to provide robust RFID tags/labels which can survive the injection molding process without adverse effects such that the tag/label is fully functional/operation.

SUMMARY

Multi-layered RFID-devices that protect the antenna from deformation and stabilize the carrier substrate during the injection molding process are described herein. Robust RFID tags/labels which can survive the injection molding process without adverse effects such that the tag/label is fully functional/operation are also described.

In one embodiment, the RFID tag/inlay contains an antenna, e.g. conductive foil like aluminum foil or wire, on a substrate, e.g., PET or paper, wherein the tag/inlay has two planar sides. In some embodiments, the tag/inlay is as described above and the IC is directly attached to the antenna structure. In some embodiments, the tag/inlay and IC attachment is as described above and at least one adhesive layer is applied to the RFID inlay on one planar side of the substrate, preferably the side on which the antenna structure and the IC are attached/located, so that the IC chip is covered or encapsulate by the adhesive. In some embodiments, the adhesive layer(s) has a thickness, measured perpendicular to the substrate surface. In some embodiments, the adhesive is a pressure sensitive or hot-melt adhesive. In some embodiments, the adhesive is a polyacrylic or polyester adhesive.

In some embodiments, the tag/inlay is as described above, a stabilizing and heat resistant layer is applied to the adhesive layer. In some embodiments, synthetic papers, such as high density polyethylene which has been simultaneously stretched in both planar directions is used. In some embodiments, the stabilizing/heat resistant layer provides adhesion and compensates for differences in thermal expansion and shrinkage between the antenna material and the plastic material to be molded.

In some embodiments, at least one adhesive layer is applied to the planar side of the substrate opposite the side on which the IC chip is attached. In some embodiments, this layer provides additional heat protection.

In some embodiments, the RFID inlay/tag attaches to the wall of the injection mold chamber by electrostatic charge. After injecting molding, the RFID inlay/tag is integrated into the injection mold product without adverse effect to the RFID inlay/tag.

Methods of manufacturing the RFID inlays/tags/devices described herein are also disclosed. In some embodiments, the process includes producing an antenna structure for the RFID inlay/tag/device. In some embodiments, the antenna is produced by etching, die cutting and/or laser cutting. In some embodiments, the antenna is produced by die cutting. In some embodiments, the antenna is produced by laser cutting. In some embodiments, the antenna is produced by both die cutting and laser cutting.

In some embodiments, the antenna is produced as described above and the antenna is attached onto a stabilizing carrier substrate, such as a polyester or plastic (polyolefin), PET or paper, wherein the carrier substrate has two planar sides.

In some embodiments, the antenna is produced as described above and the IC is attached to the antenna/antenna structure by direct chip attachment, an IC chip onto the antenna structure. In some embodiments, the IC is attached to a strap of conductive material and the strap is attached to the antenna.

In some embodiments, the antenna is produced and the IC is attached as described above and an adhesive layer is applied to at least one planar side of the substrate, preferably the side of the substrate on which the antenna and IC is attached. In some embodiments, the adhesive is a heat seal adhesive. In some embodiments, the process is as described above, and a layer or film of a stabilizing and heat resistant material to the adhesive layer. In some embodiments, the stabilizing and heat resistant material is a heat seal adhesive. In some embodiments, the heat seal adhesive is a synthetic paper, such as polyolefin which has been stretched in two dimensions.

A variety of antenna/antenna structures known in the art can be used. In some embodiments, the antenna is a metallic foil or wire, such as aluminum, copper, or silver. In other embodiments, the antenna is formed of, from, or printed from, a conductive resin. Exemplary conductive resins include, but are not limited to, silver (Ag)-inks or pastes, gold (Au)-based inks or pastes, copper (Cu)-based inks or pastes, and/or graphene-based inks or pastes. Other conductive material suitable for printing RFID antennas may also be used.

In some embodiments, the antenna is as described above and the substrate is a polymeric material, such as polyurethane. In some embodiments, the IC is not directly connected to the antenna structure; but rather a strap having a chip or IC mounted thereon is attached using a thin layer of adhesive. In some embodiments, a small square of hot melt over-laminate may be placed over the strap and bonded. Other methods of strap attachment of the chip are known, such as those described in U.S. Pat. No. 10,198,677; 6,940,408 or 7,292,148.

As discussed above, in some embodiments, the substrate is a synthetic paper. In some embodiments, the synthetic paper is a high density polyethylene (HDPE) which has been simultaneously stretched in both directions.

In some embodiments, a heat seal adhesive is incorporated between the substrate material and the face material.

In some embodiments, the strap with the IC is attached on the opposite side of the carrier substrate than the face material. In some embodiments, a second layer of heat seal adhesive is applied to the strap-side of the carrier substrate for further heat protection and stabilization.

In other embodiments, the manufacturing process includes (1) preparing a conductive resins, such as a silver, gold, copper, or graphene ink or paste; (2) printing a RFID antenna structure onto a carrier substrate (e.g., polyurethane); (3) attaching an IC onto a small strap of a carrier substrate, such as PET, wherein the strap may have conductive structures attached there to, such as contact points or patches; (4) attaching the strap with the IC to the printed antenna structure such that the IC electrically contacts the conductive material of the antenna structure; (5) applying on at least one planar side of the carrier substrate, a layer of a heat seal adhesive; and (6) attaching to the layer of heat seal adhesive a planar layer of a synthetic paper, e.g. polyolefin.

In some embodiments, the device and process used to make the device does not require the use of an adhesive. In some embodiments, a face material which is stable and heat resistant e.g., a polyolefin film or foil. In some embodiments, the antenna structure of the RFID inlay is printed directly on the face material, using conductive resins. Exemplary conductive inks include, but are not limited to, silver (Ag), copper, graphene, gold (Au) or any other conductive material suitable for printing conductive structures. In some embodiments, a strap having a chip or integrated circuit, mounted on the antenna structure opposite to the face material, is attached with a thin layer of adhesive. In some embodiments, a small square of hot melt over-laminate may be placed over the strap and bonded. This embodiment is especially advantageous, since the RFID device can be very thin as compared to other embodiments and especially as compared to prior art devices.

In yet another embodiments, the manufacturing process includes (1) preparing a conductive resin; (2) printing a RFID antenna structure onto a face material, such as a stable and heat resistant polyolefin film or foil; (3) attaching an IC chip onto a small strap of a carrier substrate, such as PET, wherein the strap may have conductive structures on it, such as contact points or patches; and (4) attaching the strap with the IC to the printed antenna structure such that the IC electrically contacts the conductive material of the antenna structure.

DETAILED DESCRIPTION

Figure 1:
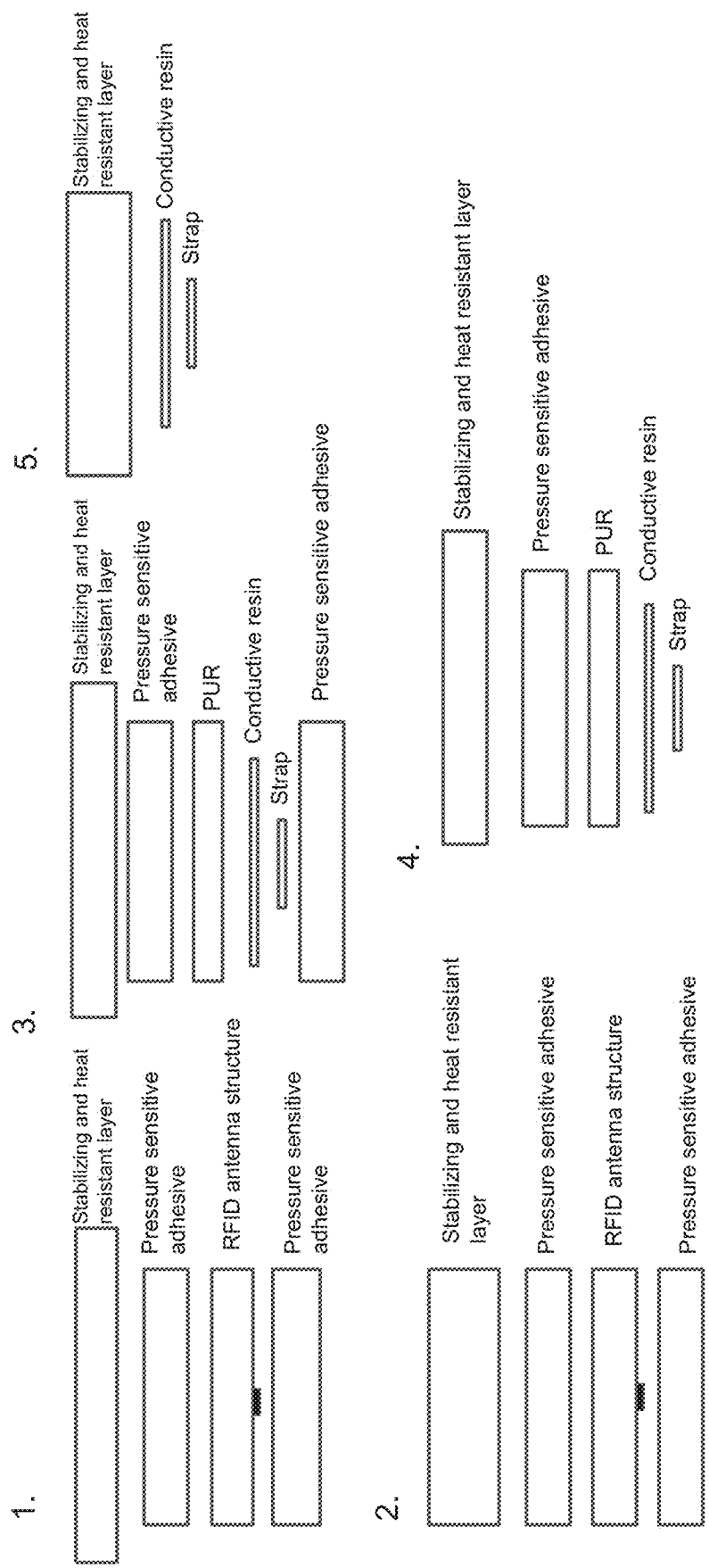
FIG. 1 is a schematic showing different examples of material stacks of different embodiments the inventive device.

In FIG. 1, Nr. 1 is an example of material stacks of an embodiment of an exemplary device described herein. A RFID inlay containing an aluminum antenna on a PET substrate and an IC directly attached to the antenna structure. Two adhesive layers are applied to the RFID inlay on both sides. The adhesive is a heat seal adhesive, e.g., the polyester based adhesive film.

On the side of the antenna structure the IC chip is attached to a stabilizing and heat resistant layer is applied on top of the adhesive layer. Synthetic papers like high density polyethylene which has been simultaneously stretched are best suited for this purpose. The adhesive layers both provide adhesion and compensate for differences in thermal expansion and shrinkage between the antenna material and the plastic material to be molded. In other embodiments the stabilizing and heat resistant layer comprises Polypropylene (PP) and/or Amorpheous-Polyethylene-Terephthalate (APET)

FIG. 1, Nr. 2 depicts an alternative of the same embodiment. A thicker stabilizing and heat resistant layer—was chosen for increased stability and heat protection. Thicker materials can be used whenever thermal expansion or shrinkage is still a problem with the example given in FIG. 1 Nr.1. However, the overall size of the RFID device will increase.

FIG. 1, Nr. 3 shows the material stacks of another embodiment of an exemplary devices described herein. A conductive resin is used to print a RFID antenna structure on a carrier substrate, e.g., polyurethane. The IC is not directly connected to the antenna structure. Instead, a strap having a chip or integrated circuit mounted thereon is attached to the printed antenna structure. The strap is mounted directly to the antenna material printed on the carrier substrate.

The embodiment depicted in FIG. 1 Nr. 3 may also be used without an additional layer of adhesive. This alternative variant of the embodiment is depicted in FIG. 1 Nr. 4. In this variant, a thinner carrier substrate, e.g., a polyurethane. The advantage of the variant is that the resulting RFID device is thinner.

FIG. 1 Nr. 5 is another exemplary embodiment of the device described in that does not require the use of an adhesive. A face material is used as a stable and heat resistant layer. Exemplary materials include, but are not limited to, polyolefin foil. The antenna structure of the RFID inlay is printed directly on the face material, for example, using a conductive resin. A strap having a chip or integrated circuit is mounted on the antenna structure opposite of the face material. This embodiment is advantageous, since the RFID device can be very thin as compared to other embodiments and prior art devices.

The embodiments and examples outlined in this application, especially the materials used and the combination of materials are not to be considered as final. Rather they represent examples that were tested and considered the best combination of materials. However, any other material offering similar features as those described herein, may be considered for the inventive RFID device.

What is claimed is:

1. A radio frequency identification (RFID) device for injection molded articles, the device comprising:
   (a) an inlay comprising an RFID antenna structure comprising a conductive material;
   (b) an RFID integrated circuit (IC) chip, wherein the RFID IC chip is either attached directly to the RFID antenna structure on one side of the inlay or an RFID strap comprising the RFID IC chip is attached directly to the RFID antenna structure on one side of the inlay, enabling an electrical contact between the RFID IC chip and the RFID antenna structure;
   (c) a stabilizing and heat resistant layer comprising a high density polyethylene film stretched in two dimensions; and
   (d) at least one pressure sensitive adhesive layer;
   (e) wherein the at least one pressure sensitive adhesive layer is applied at least between the inlay and the stabilizing and heat resistant layer.

2. The RFID device of claim 1, wherein the side of the inlay comprising the RFID IC chip is covered with one of the at least one pressure sensitive adhesive layer and facing away from the stabilizing and heat resistant layer.

3. A radio frequency identification (RFID) device for injection molded articles, the device comprising:
   (a) a stabilizing and heat resistant layer comprising a high density polyethylene film stretched in two dimensions;
   (b) an antenna structure printed with conductive resin on a polyurethane substrate;
   (c) an integrated circuit (IC) attached directly to the antenna structure or an IC attached to a substrate strap, the substrate strap attached to the antenna structure or the RFID strap attached directly to the antenna structure on one side of an inlay, enabling an electrical contact between the IC and the antenna structure;
   (d) at least one layer of a heat seal adhesive,
   wherein the at least one adhesive layer is applied at least between the inlay and the stabilizing and heat resistant layer.

4. A radio frequency identification (RFID) device for injection molded articles, the device comprising:
   (a) an inlay comprising an RFID antenna structure comprising a conductive material;
   (b) an integrated circuit (IC) attached directly to the RFID antenna structure on one side of the inlay;
   (c) a stabilizing and heat resistant layer comprising a high density polyethylene film stretched in two dimensions;
   (d) at least one layer of a heat seal adhesive;
   wherein the at least one heat seal adhesive layer is applied at least between the inlay and the stabilizing and heat resistant layer and
   wherein the stabilizing and heat resistant layer is at least 5 times the thickness of the inlay and the at least one heat seal adhesive layer is at least 3 times the thickness of the inlay.

5. The RFID device of claim 4, wherein the side of the inlay comprising the IC is covered with one of the at least one layer of the heat seal adhesive and facing the stabilizing and heat resistant layer.

6. The RFID device of claim 4, wherein the heat seal adhesive is a polyester based adhesive heat-seal film.

7. The RFID device of claim 4, wherein the stabilizing and heat resistant layer comprises a synthetic paper.

8. A radio frequency identification (RFID) device for injection molded articles, the device comprising:
   (a) a stabilizing and heat resistant layer comprising a high density polyethylene film stretched in two dimensions;
   (b) an antenna structure printed with conductive resin on a polyurethane substrate;
   (c) an integrated circuit (IC) attached to a polyethylene terephthalate (PET) strap, the strap attached to the antenna structure, enabling an electrical contact between the IC and the antenna structure; and
   (d) at least one heat seal adhesive layer,
   wherein the at least one heat seal adhesive layer is applied at least between an inlay and the stabilizing and heat resistant layer.

9. The RFID device of claim 8, wherein the at least one heat seal adhesive layer comprises a polyester based adhesive.

10. The RFID device of claim 8, wherein the stabilizing and heat resistant layer comprises a synthetic paper.

11. A radio frequency identification (RFID) device for injection molded articles, the device comprising:
    (a) a stabilizing and heat resistant layer comprising a high density polyethylene film stretched in two dimensions;
    (b) an antenna structure printed with a conductive resin directly onto the stabilizing and heat resistant layer;
    (c) an integrated circuit (IC) attached to a strap, the strap attached to the antenna structure enabling an electrical contact between the IC and the antenna structure.

12. The RFID device of claim 11, wherein the IC is attached directly to the antenna structure.

* * * * *